US012774394B2

(12) United States Patent
Lüchinger et al.

(10) Patent No.: US 12,774,394 B2
(45) Date of Patent: Oct. 27, 2026

(54) KSF—INKS

(71) Applicant: Avantama AG, Stäfa (CH)

(72) Inventors: Norman Lüchinger, Meilen (CH); Diego Giovanoli, Zürich (CH); Deniss Sabani, Greifensee (CH)

(73) Assignee: Avantama AG, Stäfa (CH)

( * ) Notice: Subject to any disclaimer, the term of this patent is extended or adjusted under 35 U.S.C. 154(b) by 436 days.

(21) Appl. No.: 18/578,943

(22) PCT Filed: Jul. 11, 2022

(86) PCT No.: PCT/EP2022/069325

§ 371 (c)(1),
(2) Date: Jan. 12, 2024

(87) PCT Pub. No.: WO2022/207943

PCT Pub. Date: Oct. 6, 2022

(65) Prior Publication Data

US 2024/0318017 A1 Sep. 26, 2024

(30) Foreign Application Priority Data

Jul. 13, 2021 (EP) .................................... 21185197

(51) Int. Cl.
*C09D 11/037* (2014.01)
*C09D 11/107* (2014.01)

(52) U.S. Cl.
CPC .......... *C09D 11/037* (2013.01); *C09D 11/107* (2013.01)

(58) Field of Classification Search
CPC .................................................... C09D 11/107
See application file for complete search history.

(56) References Cited

U.S. PATENT DOCUMENTS

| | | | |
|---|---|---|---|
| 2012/0313045 | A1 | 12/2012 | Shim |
| 2019/0153313 | A1 | 5/2019 | Lüchinger et al. |
| 2019/0241804 | A1 | 8/2019 | Aboulaich et al. |

FOREIGN PATENT DOCUMENTS

| | | | |
|---|---|---|---|
| CN | 109294335 | A | 2/2019 |
| JP | H07188599 | A | 7/1995 |
| JP | H0822044 | B2 | 3/1996 |
| JP | 6780255 | B2 | 11/2020 |
| JP | 6822044 | B2 | 1/2021 |

OTHER PUBLICATIONS

International Search Report and Written Opinion for corresponding Application No. PCT/EP2022/069325, issued Aug. 17, 2022.
Hou, et al. J. Mater. Chem. C, 2018, DOI: 10.1039/C8TC00133B.
Naab, et al. "GE K 2 SiF 6 :Mn 4+ (PFS/KSF) Phosphor: Market Leading Wide Color Gamut Technology & Path Towards Enabling Next Generation Displays" GE 2019 SID.
Oh, et al. "Analysis of wide color gamut of green/red bilayered freestanding phosphor film-capped white LEDs for LCD backlight" Department of Chemistry, Kookmin University, Seoul 136-702, South Korea, yrdo@kookmin.ac.kr. © 2015 Optical Society of America.

*Primary Examiner* — Peter F Godenschwager
(74) *Attorney, Agent, or Firm* — RENNER, OTTO, BOISSELLE & SKLAR, LLP

(57) ABSTRACT

Described are liquid compositions containing luminescent particles in a high loading, particularly from the class of red luminescent phosphor particles, in a diluent, particularly from the class of curable monomers with low polarity. The invention further provides for the manufacture of such inks and to the use of such inks for preparing films and lighting devices.

16 Claims, No Drawings

KSF—INKS

This application is a national phase of International Application No. PCT/EP2022/069325 filed Jul. 11, 2022, which claims priority to European Patent Application No. 21185197.7 filed Jul. 13, 2021, each of which is hereby incorporated herein by reference in its entirety.

TECHNICAL FIELD

The present invention relates to liquid compositions containing (i.e. comprising or consisting of) luminescent particles in a diluent ("luminescent inks"), to the manufacture of such inks and to the use of such inks for preparing films and lighting devices.

BACKGROUND ART

Luminescent inks are widely used in industry. They are of key importance for manufacturing luminescent films, either self-supporting or on a substrate. The thus obtained films are essential elements in lighting and display devices. Oh et al. (Optics Express A791, 23, 15) disclose green/red bilayered freestanding phosphor film-capped white light-emitting diodes (W-LEDs) using InGaN blue LEDs and narrow-band red and green phosphors to realize a wide color gamut in a liquid crystal display backlight system. For fabricating phosphor films, up to 50 wt % red luminescent $K2SiF6:Mn4+$ (KSF) particles with a particle size of 10 micron are dispersed in a silicone binder, coated on a substrate and cured at 150° C./1 h. Although suitable in a laboratory set up, it is generally accepted that Silicones are disadvantageous in commmercial production, particularly continuous roll-to-roll production. It is also accepted that silicones are frequently incompatible with other functional layers.

JP6780255 discloses image display devices and compositions for manufacturing the same. The compositions disclosed contain luminescent particles, polar acrylates and solvent. CN109294335 discloses fluorescent pigment pastes comprising 10-50 wt water as diluent.

US2019/0153313 discloses solid polymer compositions comprising luminescent perovskite particles.

US2012/313045 discloses UV coating compostions for LED color conversion. These composition comprise polar acrylates and specific phosphors.

US2019/241804 discloses methods for producing photoluminescent microparticles. The document aims to provide powders of luminescent particles having improved optical performance. To achieve this, the document proposes surface-modification (33, 34) of nanoparticles (32) with organofunctional surface agents.

DISCLOSURE OF THE INVENTION

In view of the prior art, there is a need for improved luminescent inks and for methods to obtain such inks.

These objectives are achieved by a liquid composition (a "luminescent ink") and by methods and uses as described herein. Thus, in more general terms, the invention provides

- in a first aspect to luminescent inks;
- in a second aspect the manufacturing of such luminescent inks;
- in a third aspect the use of such inks for manufacturing luminescent films and devices.

The present invention will be described in more detail below. Unless otherwise stated, the following definitions shall apply in this specification:

It is understood that the various embodiments, preferences and ranges as provided/disclosed in this specification may be combined at will. Further, depending of the specific embodiment, selected definitions, embodiments or ranges may not apply. Thus, definitions and embodiments discussed in the first aspect of the invention are applicable to the second and third aspect and vice verse, unless the context clearly prohibits such understanding.

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

In more general terms, in a first aspect, the invention relates to a liquid composition containing luminescent particles in a diluent as defined below ("luminescent ink"). Suitable luminescent particles may be selected from the class of red luminescent phosphor particles with a volume-weighted average particle size of 0.1-50 micron and suitable diluents may be selected from the class of curable monomers with defined polarity. These inks are easy to manufacture, stable and useful for obtaining luminescent films, either self-supporting or on a substrate. This aspect of the invention shall be explained in further detail below:

Inks:

Typically, the viscosity of the inventive composition is adjusted to more than 50 cP, preferably more than 500 cP, more preferably more than 5'000 cP, most preferably more than 50'000 cP, when measured with a rotational viscometer. The viscosity may be adjusted by selecting suitable curable monomers and/or by adjusting the concentration of luminescent particles and/or by including additives.

In embodiments, the inventive liquid composition has the viscosity of a paste.

Typically, the concentration of said luminescent particles is 10-80 wt %, preferably 25-75 wt %, more preferably 40-70 wt %, most preferably 50-70 wt % of the ink. This is a comparatively high concentration. It comes as a surprise that such high concentrations can be achieved. Without being bound to theory, it is believed the curable monomers provide a stabilizing effect to the luminescent particles, thereby preventing degradation of the optical properties (e.g. quantum yield; "QY").

Luminescent Particles:

A broad range of luminescent particles may be used in the context of the present invention. Suitable are particles from the class of red luminescent phosphor particles. Such particles are known per se and commercially available. Typically, phosphors are inorganic particles and have a particle size of more than 0.1 micron. Accordingly, in the context of the present invention, core-shell QDs with a size of typically <50 nm are not considered luminescent phosphor particles.

The term "phosphor" is known in the field and relates to materials that exhibits the phenomenon of luminescence, specifically fluorescent materials. Accordingly, a red phosphor is a material showing luminescence in the range of 610-650 nm, e.g. centered around 630 nm. Accordingly, a green phosphor is a material showing luminescence in the range of 500-550 nm, e.g. centered around 530 nm.

The term "phosphor particles" means particles of the phosphor as described above. The particles can be single crystalline or polycrystalline. In the context of the present invention, the term particles refers to primary particles, not secondary particles (e.g. agglomerates or conglomerates of primary particles). Suitable luminescent particles have a particle size (volume-weighted average) $s_p$ of $s_p \leq 50$ μm, advantageously of $s_p \leq 20$ μm, advantageously of $s_p \leq 10$ μm, advantageously of $s_p \geq 100$ nm, advantageously of $s_p \geq 500$ nm, advantageously of $s_p \geq 1000$ nm. Further advantageously, the luminescent particles have a particle size (volume-weighted average) of 100 nm$\leq s_p \leq$50 μm, very particular 500 nm$\leq s_p \leq$20 μm, an more particular 1000 nm$\leq s_p \leq$10 μm. Particle sizes are measured by means of standard characterization methods, e.g. scanning electron microscopy (SEM).

Luminescent particles show, as the term indicates, luminescence. A luminescent particle is a material exhibiting photoluminescence. This means that light with a first wavelength is absorbed by the luminescent particle and emitted at a second wavelength, typically higher than the first wavelength (so called down-conversion).

In embodiments, the luminescent particles are selected from Mn+4 doped phosphor particles, particularly according to formula (II):

$$[A]_x[MF_y]:Mn^{4+}, \quad \text{(II)}$$

wherein

A represents Li, Na, K, Rb, Cs or a combination thereof,

M represents Si, Ge, Sn, Ti, Zr, Al, Ga, In, Sc, Y, La, Nb, Ta, Bi, Gd, or a combination thereof, x represents the absolute value of the charge of the [MFy] ion; and Y represents 5, 6 or 7.

A preferably represents K.

M preferably represents Si.

X preferably represents 2.

Y depends on the coordingation number of M, but preferably represents 6.

In a further advantageous embodiment of the invention, the luminescent particles are red phosphor Mn+4 doped phosphor particles of formula (II'): $K_2SiF_6$:$Mn^{4+}$ (II').

In a further advantageous embodiment luminescent particles are free of an encapsulation. It was found that the luminescent particles do not need any encapsulation (such as particle surface protection or shelling) to be chemically compatible with curable monomers. In particular, luminescent particles are distributed within a curable monomer and/or in a polymer and in particular are essentially distributed within the polymer such that they do not exceed a surface of the polymer. As no protection layer or shell is necessary, the processing steps for the manufacturing of luminescent particles can be reduced.

In a further advantageous embodiment of the solid polymer composition, the difference in concentration $\Delta c_{Mn}$ of Mn between the center of each luminescent particle and an area 100 nm below the particle surface is $\Delta c_{Mn} \leq 50\%$, in particular $\Delta c_{Mn} \leq 20\%$. In particular, such concentration differences $\Delta c_{Mn}$ can be determined by using scanning electron microscopy (SEM) equipped with energy dispersive X-ray spectroscopy (EDX) on a cross-section of a single phosphor particle. Such cross-section of a single phosphor particle can be prepared by focused ion beam (FIB). The center of the particle refers in particular to a center area of the particle, in particular a core or core region of the particle.

In embodiments, the luminescent particles have a Manganese (Mn)-concentration $c_{Mn}$ Of $c_{Mn} \geq 2$ mol %, in particular of $c_{Mn} \geq 3$ mol %, in particular of $c_{Mn} \geq 4$ mol %.

In embodiments, the luminescent particles are non-modified luminescent particles. The term s which means non coated with organofunctional surface agents. Accordingly, in this embodiment, the luminescent particle are free of a shell comprising surface agents and/or coupling agents, such as organofunctional surface agents (e. g. silanes with hydrolysable and non-hydrolysable group). It was surprisingly found that the combination of specific luminescent crystals described herein in combination with the specific diluent described herein allows formation of a stable ink, free of solvent. Such absence of a solvent simplifies manufacturing of light emitting devices. It comes as a surprise, given the teaching of US2019241804, that optical performance is maintained even without additional treatment or surface modification of the luminescent particles.

Diluent/Curable Monomer:

In embodiments, the diluent consists of one or more curable monomers. This embodiment is exemplified in ex. 1 and 2. This embodiment is advantageous, as it allows simple manufacturing of inks.

In further embodiments, the diluent contains one or more curable monomers and additives. Such additives are known in the field and include viscosity modifiers and compounds inducing curing of monomers ("initiators"). The term additive shall not include solvents. Further, the term additive shall not include organofunctional surface agents, such as organic ligands which may bind on the particle surface.

For example, the diluent may comprise more than 50 wt % (preferably more than 80 wt %) of curable monomers, the remaining part being one or more additives. This embodiment is exemplified in ex. 3. This embodiment is advantageous, as it allows fine-tuning of ink viscosity, thus allowing to achieve higher viscosities than given by the intrinsic viscosities of the monomer or monomer mixture.

For example, the diluent may comprise an initiator to allow curing of the monomer. Suitable initiators are selected depending on the type of curable monomer. In case of acrylate monomers, photoinitiators may be added. Such photoinitiators are commercial items.

Typically, the diluent is free of solvent. Such solvent-free diluents facilitate manufacturing of films and reduce process steps in manufacturing lighting and display devices.

Suitable curable monomer may be selected from a large variety of monomers. Such monomers comprise C—C double bonds, cleavable ring structures reactive moieties. Said curable monomer may be curable by light (e.g. UV) or by temperature. Accordingly, they include acrylate monomers, vinyl monomers, urethane monomers (Isocyanates+Alcohols), styrene monomers, epoxy monomers, norbornene monomers.

Polarity (z): The ratio of heteroatoms (i.e. atoms other than carbon and hydrogen) to carbon is an indicator for monomer polarity. In embodiments of the invention the monomer has a molar ratio z of the sum of (oxygen+nitrogen+sulphur+phosphorous+fluorine+chlorine+bromine+iodine) to (carbon) where $z \leq 0.9$, such as $z \leq 0.75$ in particular $z \leq 0.4$, in particular $z \leq 0.3$, and more particular $z \leq 0.25$, even more particular $z \leq 0.2$. Atoms not present in the respective monomer are set to a value=0. The lower the value of z, the less polar are the respective curable monomers. The z-value relates to an individual monomer, in case the diluent contains only one monomer. The z-value relates to the whole mixture of monomers, in case the diluent contains more than one monomer.

In the context of this invention, monomers with $0.3<z<0.9$ are considered polar. Suitable polar acrylates may be selected from the class of multifunctional acrylates, particularly if no other monomers are present.

In the context of this invention, monomers with z≤0.3 are considered apolar. Particular good results are observed when using apolar monomers or combinations of monomers having an average value of z≤0.3, such as z≤0.25. It was surprisingly found that the combination of such apolar polymers, particularly aprolar acrylates, provides excellent results when combined with luminescent phosphors of formula (II). High loadings can be achieved and use of solvents can be avoided, still providing materials with excellent optical properties.

Transmittance: Typically, curable monomers used in the context of this invention result upon curing/polymerization in polymers which are light transmissive for visible light, i.e. non-opaque for allowing light emitted by the luminescent particles, and possible light of a light source used for exciting the luminescent particles to pass. Light transmittance may be determinded by white light interferometry or UV-Vis spectrometry.

In one preferred embodiment of the invention the monomer is an acrylate. Advantageously, the monomer contains (ie. comprises or consists of) units of mono-functional acrylates (III) and units of multi-functional acrylates (V). As the term implies, mono-functional acrylates comprise one acrylate functionality while multi-functional acrylates comprise 2, 3, 4, 5 or 6 acrylate functionalities. As used herein, the term acrylates also includes (Meth)acrylates. The amount of mono-functional acrylate units (III) and multi-functional acrylate units (V) may vary over a broad range. Suitable are, for example, monomers comprising 10-90 wt %, preferably 50-80 wt %, monofunctional acrylate units. Suitable are, for example, monomers comprising 10-90 wt %, preferably 20-50 wt %, multifunctional acrylate repeating units.

In one preferred embodiment the units comprise monofunctional acrylates of formula (III)

(III)

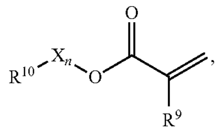

wherein:

$R^9$ represents H or $CH_3$, $R^{10}$ represents a cyclic, linear or branched $C_{1-25}$ alkyl, or a $C_{6-26}$ aryl group, each optionally substituted with one or more cyclic, linear or branched $C_{1-20}$ alkyl, phenyl or phenoxy, n represents 0 or 1, and X represents a spacer from the group of alkoxylates comprising 1-8 carbon atoms and 1-4 oxygen atoms.

The term cyclic $C_{x-y}$ alkyl group shall include monocyclic and polycyclic groups, including fused ring systems comprising x-y carbon atoms as ring members. Cyclic alkyl groups may also include groups with one double bond.

Compounds of formula (III) include acrylates of formulae (III-1) and (III-2) where $R^9$ is H, and Methacrylates of formula (III-3) and (III-4) where $R^9$ is Methyl, collectively also termed acrylates.

Further, compounds of formula (III) also include simple acrylates where n is 0 and X is not present, formulae (III-1) and (III-3):

(III-1)

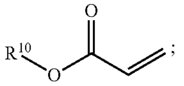

(III-3)

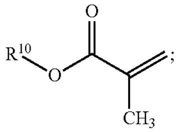

where R10 is as defined above.

Further, compounds of formula (III) also include alkoxylated acrylates, formulae (III-2) and (III-4):

(III-2)

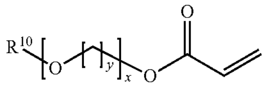

(III-4)

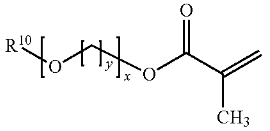

where $R^{10}$ is as defined above.

$R^{10}$ preferably represents a cyclic $C_{5-25}$ alkyl, an acyclic (linear or branched) $C_{1-25}$ alkyl, or a $C_{6-26}$ aryl, each optionally substituted with one or more cyclic, linear or branched $C_{1-20}$ alkyl, phenyl or phenoxy, $R^{10}$ more preferably represents a saturated cyclic $C_{5-25}$ alkyl group, whereby cyclic alkyl includes mono-cyclic and poly-cyclic groups optionally substituted by 1-6 substituents, each substituent independently selected from $C_{1-4}$ alkyl.

$R^{10}$ most preferably represents a saturated poly-cyclic $C_{6-25}$ alkyl group, substituted by 1-6 substituents, each substituent independently selected from $C_{1-4}$ alkyl.

$R^{10}$ further most preferably represents a saturated poly-cyclic $C_{8-25}$ alkyl group optionally comprising 1-6 substituents, each substituent independently selected from $C_{1-4}$ alkyl.

Substituent $R^{10}$ even more preferably represents isobornyl, dicyclopentanyl (di-cp), dicyclopentenyl, 3,3,5-trimethyl cyclohexyl, 4-tert-butylcyclohexyl.

Substituent $R^{10}$ more preferably represents a poly-cyclic alkyl group with $C_{5-25}$ and an unsaturated double bond on the cyclic ring including substituted groups, comprising 1-6 substituents from the group of $C_{1-4}$ alkyl.

Specific examples of acrylates of formula (III-1) and (III-3) include:

isobornylacrylate (CAS 5888-33-5), isobornylmethacrylate (CAS 7534-94-3), dicyclopentanyl-acrylate (CAS 79637-74-4, FA-513AS (Hitachi Chemical, Japan)), dicyclopentanyl-methacrylate (CAS 34759-34-7, FA-513M (Hitachi Chemical, Japan)), dicyclopentenyl-acrylate (CAS 33791-58-1, FA-511AS (Hitachi Chemical, Japan)), dicyclopentenyl-methacrylate (CAS 31621-69-9), 3,3,5-trimethyl cyclohexyl acrylate (CAS 86178-38-3), 3,3,5-trimethyl cyclohexyl methacrylate (CAS 7779-31-9), 4-tert-butylcyclohexyl acrylate (CAS 84100-23-2), and
4-tert-Butylcyclohexyl methacrylate (CAS 46729-07-1).

Specific examples of acrylates of formula (III-2) and (III-4) include:
- poly(ethylene glycol) phenyl ether acrylates (specifically 2-phenoxyethyl acrylate), O-phenyl phenoxyethyl acrylate,
- Polyethylene glycol o-phenylphenyl ether acrylate (CAS 72009-86-0),
- poly(ethylene glycol) ethyl ether methacrylate,
- Di(ethylene glycol) ethyl ether acrylate,
- Poly(ethylene oxide) nonylphenyl etheracrylate,
- Poly(propylene glycol) 4-nonylphenyl ether acrylate,
- Ethylene glycol dicyclopentenyl ether acrylate, and
- Ethylene glycol dicyclopentenyl ether methacrylate.

In one further embodiment the multifunctional units comprise di-functional acrylates of formula (V)

(V)

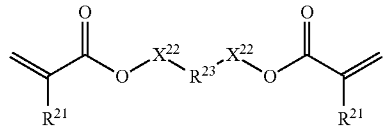

wherein
- $R^{21}$ independently from each other represent H or $CH_3$;
- $R^{23}$ represents a linear or branched $C_{1-25}$ alkyl group, each optionally substituted with one or more cyclic, linear or branched $C_{1-20}$ alkyl, phenyl or phenoxy;
- $X^{22}$ independently from each other represent a direct bond (i.e. no spacer) or a spacer selected from the group of alkoxylates, whereby both substituents $X^{22}$ together comprise 8-40 carbon atoms and 2-20 oxygen atoms.
- $X^{22}$ preferably represents a spacer selected from the group of ethoxylates and/or isopropoxylates whereby both substituents $X^{22}$ together comprise 8-24 carbon atoms and 4-8 oxygen atoms.
- $X^{22}$ most preferably represents a spacer selected from the group of ethoxylates and/or isopropoxylates whereby both substituents $X^{22}$ together comprise 4-20 carbon atoms and 2-10 oxygen atoms.

In one further embodiment, the multifunctional units comprise difunctional acrylates of formula (VI)

(VI)

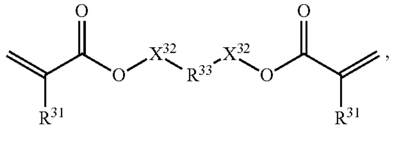

wherein:
- $R^{31}$ independently from each other represent H or $CH_3$;
- $R^{33}$ represents a cyclic $C_{5-25}$ alkyl, or a $C_{6-26}$ aryl group, each optionally substituted with one or more cyclic, linear or branched $C_{1-20}$ alkyl, phenyl or phenoxy;
- $X^{32}$ independently from each other and are either not present (R33 directly bound to the oxygen by a single bond, no spacer) or represent a spacer selected from the group of alkoxylates, whereby both substituents $X^{32}$ together comprise 1-8 carbon atoms and 1-8 oxygen atoms.
- $R^{33}$ preferably represents a $C_{6-26}$ aryl group optionally substituted with one or more cyclic, linear or branched $C_{1-20}$ alkyl, phenyl or phenoxy.
- $R^{33}$ particularly preferably represents a $C_{6-26}$ aryl group, optionally substituted with one or more cyclic, linear or branched $C_{1-20}$ alkyl. Aryl includes mono-cyclic and poly-cyclic aryls which may optionally be substituted by 1-4 substituents, said substituents being selected from the group of $C_{1-4}$ alkyl, phenyl and phenoxy.
- $R^{33}$ particularly preferably represents phenyl, benzyl, 2-naphtyl, 1-naphtyl, 9-fluorenyl.
- $R^{33}$ most preferably represents bisphenol A or fluorene-9-bisphenol.
- $X^{32}$ preferably represents a single bond, thereby directly connecting $R^{33}$ to the adjacent oxygen.
- $X^{32}$ preferably represents a spacer from the group of ethoxylates and/or isopropoxylates, whereby both substituents $X^{32}$ together 1-6 carbon atoms and 1-6 oxygen atoms.

A preferred group of diacrylates are of formula (VI-1)

(VI-1)

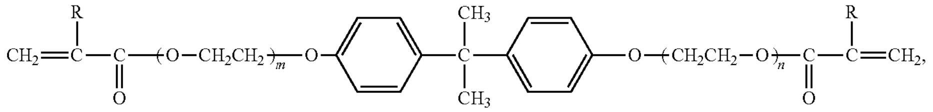

wherein R represents H or $CH_3$ and m+n is between 0 and 3; or wherein R represents H or $CH_3$ and m+n is between 4 and 10.

Specific examples of di-functional acrylates include 1,10-decanediol diacrylate, 1,6-hexanediol diacrylate, 1,6-hexanediol dimethacrylate, Neopentyl glycol dimethacrylate, tricyclodecane dimethanol diacrylate, Bisphenol A ethoxylate diacrylate (including CAS 64401-02-1, such as Miramer M240 (Miwon Korea), Miramer M2100 (Miwon Korea), Fancryl FA-324A (Hitachi Chemical, Japan), Fancryl FA-326A (Hitachi Chemical, Japan), Fancryl FA-328A (Hitachi Chemical, Japan), Fancryl FA-321A (Hitachi Chemical, Japan)). Bisphenol A ethoxylate dimethacrylate (such as Miramer M241 (Miwon Korea), Miramer M2101 (Miwon Korea), Fancryl FA-324M (Hitachi Chemical, Japan), Fancryl FA-326M (Hitachi Chemical, Japan), Fancryl FA-328M (Hitachi Chemical, Japan) Fancryl FA-321M (Hitachi Chemical, Japan)), modified fluorene-9-bisphenol diacrylate (CAS, modified fluorine-9-bisphenol dimethacrylate. Preferred examples of difunctional acrylates include
- bisphenol A ethoxylate diacrylate (including CAS 24447-78-7, Fancryl FA-320A (Hitachi Chemical, Japan)),
- bisphenol A ethoxylate diacrylate (including CAS 64401-02-1, Fancryl FA-320AP (Hitachi Chemical, Japan)),
- bisphenol A ethoxylate dimethacrylate (CAS 24448-20-2, Fancryl FA-320M (Hitachi Chemical, Japan), bisphenol A ethoxylate dimethacrylate (CAS 41637-38-1 Fancryl FA-320MP (Hitachi Chemical, Japan)) and tricyclodecane dimethanol diacrylate (CAS 42594-17-2, Miramer M262 (Miwon, Korea)).

In one preferred embodiment the multifunctional units comprise tri-, tetra, penta-, and hexafunctional acrylates. These multifunctional acrylates increase the crosslinking density and are able to increase the desired barrier properties of the second polymer.

Specific examples of trifunctional acrylates include trimetylolpropane triacrylate (CAS 15625-89-5), ethoxylated trimethylolpropane triacrylate (CAS 28961-43-5), Tris(2-Hydroxy ethyl) Isocyanurate Triacrylate (CAS 40220-08-4)

isopropoxylated trimethylolpropane triacrylate (CAS 53879-54-2), and isopropoxylatedglycerinetriacrylate (CAS52408-84-1).

Specific examples of tetrafunctional acrylates include

Di(trimethylolpropane) tetraacrylate (CAS 94108-97-1),

Pentaerythritol tetraacrylate (CAS 4986-89-4), ethoxylated pentaerythritol tetraacrylate (CAS 51728-26-8).

Specific examples of pentafunctional acrylates include

Dipentaeritritol pentaacrylate (CAS 60506-81-2).

Specific examples of hexafunctional acrylates include

Dipentaerythritol hexaacrylate (CAS 29570-58-9).

In embodiments, the diluent additionally comprises one or more additives, preferably selected from the class of viscosity modifiers. Such viscosity modifying components are commercial items and are known to the skilled person. Suitable viscosity modifiers may be selected from the group of polymeric viscosity modifiers (such as polystyrene) and thixotropy additives.

In preferred embodiments the concentration of the viscosity modifier in the diluent is 1-30 wt %, preferably 2-20 wt %, most preferably 3-15 wt %.

In a second aspect, the invention relates to a method of manufacturing a composition as described herein. This aspect of the invention shall be explained in further detail below.

In an embodiment, an ink as described herein, first aspect of the invention, is manufactured by a method comprising the steps of:

a) providing a first composition containing luminescent particles as described herein, preferably in the form of a dry powder, and a second composition containing curable monomer, preferably free of solvent;
b) combining said first and second composition optionally followed by degassing;
c) optionally adding and dissolving a viscosity modifier in the composition of step b);

to thereby obtain a luminescent liquid composition. The thus obtained inks may be used as outlined below and do not require further modification.

In another embodiment, an ink as described herein, is manufactured by a method comprising the steps of:

a) providing a first composition containing luminescent particles as described herein, preferably in the form of a dry powder, and a second composition containing curable monomer and solvent;
b) combining said first and second composition optionally followed by degassing;
c) removing said solvent from the obtained liquid composition, preferably by distillation;

to thereby obtain a luminescent liquid composition. The thus obtained inks may be used as outlined below and do not require further modification.

In a third aspect, the invention relates to use of a liquid composition as described herein for manufacturing a luminescent film, or a luminescent component, or a lighting device. This aspect of the invention shall be explained in further detail below.

Films include self-supporting films and thin layers as part of a component, e.g. films on a substrate.

Lighting devices include displays, such as LCD displays.

The films may be obtained in analogy to known methods using the inks described herein as a starting material. Suitable methods include Coating, such as R2R coating, spraying, dip-coating and the like.

A self-supporting film, as described herein comprises a solid polymer composition obtained by curing a curable monomer and luminescent particles as described herein. Typically, the particles are homogeneously distributed within said film. Advantageously, the self-supporting film emits red light in response to excitation by light of a wavelength shorter than the emitted red light. In a further advantageous embodiment, such a self-supporting film can have a thickness $t_{ssf}$ of $0.001 \leq t_{ssf} \leq 10$ mm, preferably of $0.01 \leq t_{ssf} \leq 0.5$ mm.

In embodiments, the luminescent film is sandwiched between two barrier layers. In particular, such sandwich arrangement refers to an arrangement in a horizontal direction with a barrier layer, the polymer and another barrier layer. The two barrier layers of the sandwich structure can be made of the same barrier layer material or of different barrier layer materials. The technical effect of the barrier layers is to improve the stability of the luminescent particles, in particular against oxygen or humidity. Such barrier layers are known in the field; typically comprising a material/a combination of materials with low water vapour transmission rate (WVTR) and/or low oxygen transmission rate (OTR). By selecting such materials, the degradation of the luminescent particles in the film in response to being exposed to water vapor and/or oxygen is reduced or even avoided. Barrier layers or films preferably have a WVTR<10 (g)/($m^2$*day) at a temperature of 40° C./90% r.h. and atmospheric pressure, more preferably less than 1 (g)/($m^2$*day), and most preferably less than 0.1 (g)/($m^2$*day). In an advantageous embodiment, the barrier film may be permeable for oxygen. In another advantageous embodiment, the barrier film is impermeable for oxygen and has an OTR (oxygen transmission rate)<10 (mL)/($m^2$*day) at a temperature of 23° C./90% r.h. and atmospheric pressure, more preferably <1 (mL)/(m^2*day), most preferably <0.1 (mL)/(m^2*day). In one embodiment, the barrier film is transmissive for light, i.e. transmittance for visible light>80%, preferably >85%, most preferably >90%. Suitable barrier films may be present in the form of a single layer. Such barrier films are known in the field and contain glass, ceramics, metal oxides and polymers. Suitable polymers may be selected from the group consisting of polyvinylidene chlorides (PVdC), cyclic olefin copolymer (COC), ethylene vinyl alcohol (EVOH), high-density polyethylene (HDPE), and polypropylene (PP); suitable inorganic materials may be selected from the group consisting of metal oxides, SiOx, SixNy, AlOx. Most preferably, a polymer humidity barrier material contains a material selected from the group of PVdC and COC. Advantageously, a polymer oxygen barrier material contains a material selected from EVOH polymers. Suitable barrier films may be present in the form of multilayers. Such barrier films are known in the field and generally comprise a substrate, such as PET with a thickness in the range of 10-200 μm, and a thin inorganic layer comprising materials from the group of SiOx and Alox or an organic layer based on liquid crystals which are embedded in a polymer matrix or an organic layer with a polymer having the desired barrier properties. Possible polymers for such organic layers com-prise for example PVdC, COC, EVOH.

To further illustrate the invention, the following examples are provided. These examples are provided with no intent to limit the scope of the invention.

EXAMPLE 1

120 g commercially available KSF particles (volume-weighted average particle size of 8 micron) were mixed into 100 g commercially available acrylate FA-DCPA (Hitachi-Chemical; CAS: 33791-58-1; z ratio=0.15) and stirred for 1 h using a magnetic stirrer. The obtained liquid composition is degassed by applying vacuum. The obtained liquid composition has a final viscosity of of 15 cP and contains 55 wt % KSF.

The red emission quantum yield of the obtained liquid composition was measured using an integrating sphere (Quan-taurus, Hamamatsu) 2 weeks after preparation resulting in a quantum yield of 95%. This shows that the chemical compatibility between the diluent and the KSF particles is given because the KSF particles have retained their outstanding optical properties.

After 2 weeks of preparation, 3 wt % of photoinitiator (TPO) were then dissolved in the liquid composition and coated on a PET-film, laminated with a second PET film and cured with UV-light to obtain a free-standing red luminescent film with a cured layer of 20 micron thickness. After treating the obtained film 1'000 for hours under 60° C./90% r. H. the film quantum yield did not degrade. This shows that the curable monomer used in the liquid composition resulted in cured red luminescent films able to retain the optical properties of the KSF particles under accelerated degradation conditions (high temperature and high humidity) for an extended time.

EXAMPLE 2

100 g commercially available KSF particles (volume-weighted average particle size of 8 micron) were mixed into 100 g commercially available acrylate FA-DCPA (Hitachi-Chemical; CAS: 33791-58-1; z ratio=0.15) and stirred for 1 h using a magnetic stirrer. Then 100 g of a commercially available multi-functional acrylate monomer (viscosity>100'000 cP) was added and dissolved by stirring. The obtained liquid composition is degassed by applying vacuum. The obtained liquid composition has a final viscosity of 750 cP and contains 33 wt % KSF.

The quantum yield of the liquid composition after 2 weeks of room temperature storage was similar as in example 1. A red luminescent film was prepared analogous to examples 1 and the quantum yield after 1'000 hours under 60° C./90% r. H. could also be retained.

EXAMPLE 3

100 g commercially available KSF particles (volume-weighted average particle size of 8 micron) were mixed into 100 g commercially available trimethyl cyclohexanol methacrylate (CAS: 7779-31-9; z ratio=0.15) and stirred for 1 h using a magnetic stirrer. Then 14 g of a commercially available viscosity modifier (polystyrene) was added and dissolved with a high-shear mixer. The obtained liquid composition is degassed by applying vacuum. The obtained liquid composition has a final viscosity of of 6000 cP and contains 47 wt % KSF.

The quantum yield of the liquid composition after 2 weeks of room temperature storage was similar as in example 1. A red luminescent film was prepared analogous to examples 1 and the quantum yield after 1'000 hours under 60° C./90% r.H. could also be retained.

EXAMPLE 4

100 g commercially available KSF particles (volume-weighted average particle size of 8 micron) were mixed into 100 g toluene and stirred for 1 h using a magnetic stirrer. Then 100 g of a commercially available multi-functional acrylate monomer (viscosity>100'000 cP) was added and dissolved by stirring. Then the toluene is distilled off from the liquid composition by using a rotary evaporator. The obtained liquid composition has a final viscosity of ca. 130'000 cP and contains 50 wt % KSF.

The quantum yield of the liquid composition after 2 weeks of room temperature storage was similar as in example 1. A red luminescent film was prepared analogous to examples 1 and the quantum yield after 1'000 hours under 60° C./90% r.H. could also be retained.

The invention claimed is:

1. A liquid composition containing luminescent particles in a diluent, wherein the concentration of said luminescent particles in said liquid composition is between 25-75 wt %;

the diluent comprises a curable monomer selected from the class of acrylate monomers, the curable monomer having a molar ratio z of the sum of (oxygen+nitrogen+halogens+sulfur) to carbon, wherein z≤0.25; and optionally comprises additives; and is essentially free of solvent or free of solvent; and the luminescent particles are selected from the class of red luminescent phosphor particles showing luminescence in the range of 610-650 nm, and have a volume-weighted average primary particle size $s_p$, 100 nm≤$s_p$≤50 μm; and are Mn+4 doped phosphor particles of formula (II):

$$[A]_x[MF_y]:Mn^{4+} \quad \text{(II), wherein:}$$

A represents Li, Na, K, Rb, Cs or a combination thereof,

M represents Si, Ge, Sn, Ti, Zr, Al, Ga, In, Sc, Y, La, Nb, Ta, Bi, Gd, or a combination thereof, x represents the absolute value of the charge of the [MFy] ion, and y represents 5, 6 or 7, and wherein the viscosity of the liquid composition is more than 500 cP at room temperature and measured by rotational viscosimetry.

2. The composition of claim 1, wherein the luminescent particles are Mn+4 doped phosphor particles of formula (II'): $K_2SiF_6:Mn^{4+}$ (II').

3. The composition according to claim 1, wherein the concentration of said luminescent particles in said composition is between 40-70 wt %.

4. The composition according to claim 1, wherein the curable monomer is selected from the class of mono-functional acrylate monomers, di-functional acrylate monomers, multi-functional acrylate monomers and combinations thereof.

5. The composition according to claim 4 comprising multifunctional acrylates, wherein 80%-100% (n/n) of said acrylate is a trifunctional acrylate.

6. The composition according to claim 1, wherein the curable monomer is selected from compounds of formulae (III), (V), (VI) and combinations thereof:

(III)

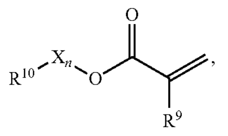

wherein:

$R^9$ represents H or $CH_3$, $R^{10}$ represents a cyclic, linear or branched $C_{1-25}$ alkyl, or a $C_{6-26}$ aryl group, each optionally substituted with one or more cyclic, linear or branched $C_{1-20}$ alkyl, phenyl or phenoxy, n represents 0 or 1, and X represents a spacer from the group of alkoxylates comprising 1-8 carbon atoms and 1-4 oxygen atoms;

(V)

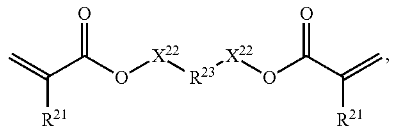

wherein:

$R^{21}$ independently from each other represent H or $CH_3$;

$R^{23}$ represents a linear or branched $C_{1-25}$ alkyl group, each optionally substituted with one or more cyclic, linear or branched $C_{1-20}$ alkyl, phenyl or phenoxy;

$X^{22}$ independently from each other represent a direct bond or a spacer selected from the group of alkoxylates, whereby both substituents $X^{22}$ together comprise 8-40 carbon atoms and 2-20 oxygen atoms;

(VI)

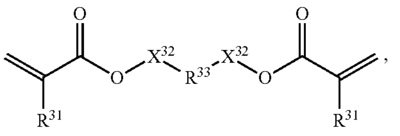

wherein:

$R^{31}$ independently from each other represent H or $CH_3$;

$R^{33}$ represents a cyclic $C_{5-25}$ alkyl, or a $C_{6-26}$ aryl group, each optionally substituted with one or more cyclic, linear or branched $C_{1-20}$ alkyl, phenyl or phenoxy;

$X^{32}$ independently from each other and are either not present or represent a spacer selected from the group of alkoxylates, whereby both substituents $X^{32}$ together comprise 1-8 carbon atoms and 1-8 oxygen atoms.

7. The composition according to claim 6 comprising acrylate monomers where $R^{10}$ and/or $R^{33}$ are independently selected from the group consisting of isobornyl, dicyclopentanyl, dicyclopentenyl, 3,3,5-trimethyl cyclohexyl, and 4-tert-butylcyclohexyl.

8. The composition according to claim 1 additionally comprising one or more initiators.

9. The composition according to claim 1 additionally comprising one or more viscosity modifiers.

10. The composition according to claim 9, wherein the one or more viscosity modifiers are selected from the group consisting of polymers and thixotropy additives.

11. The composition according to claim 1, wherein the viscosity of said composition is more than −5000 cP, at room temperature and measured by rotational viscosimetry.

12. The composition according to claim 1, additionally comprising one or more photoinitiators.

13. A method of manufacturing a composition according to claim 1, said method comprising the steps of:

a) providing a first composition containing luminescent particles, and a second composition containing curable monomer and optionally initiator, both compositions being free of solvent, then b) combining said first and second composition, optionally followed by degassing, c) optionally adding and dissolving a viscosity modifier in the composition of step b);

to thereby obtain the luminescent liquid composition.

14. A method of manufacturing a composition according to claim 1, said method comprising the steps of:

a) providing a first composition containing luminescent particles, and a second composition containing curable monomer and solvent;

b) combining said first and second composition optionally followed by degassing;

c) removing said solvent from the obtained liquid composition, and d) optionally adding and dissolving a viscosity modifier in the composition of either step b) or c);

to thereby obtain the luminescent liquid composition.

15. A method for manufacturing a luminescent film or a luminescent component comprising the step of coating a liquid composition according to claim 1 on a substrate.

16. A method for manufacturing a display, particularly an LCD display, said method comprising the step of coating a liquid composition according to claim 1 on a substrate and assembling the thus obtained luminescent film or component to thereby obtain a display.

* * * * *